(12) United States Patent
Dennes et al.

(10) Patent No.: US 7,985,094 B2
(45) Date of Patent: Jul. 26, 2011

(54) CONNECTOR BLOCK

(75) Inventors: Wayne William Dennes, Wyoming (AU); Brent David Allwood, Buttaba (AU)

(73) Assignee: ADC GmbH, Berlin (DE)

( * ) Notice: Subject to any disclaimer, the term of this patent is extended or adjusted under 35 U.S.C. 154(b) by 18 days.

(21) Appl. No.: 12/560,220

(22) Filed: Sep. 15, 2009

(65) Prior Publication Data

US 2010/0068917 A1   Mar. 18, 2010

(30) Foreign Application Priority Data

Sep. 15, 2008   (AU) ................. 2008904784

(51) Int. Cl.
  *H01R 11/20*   (2006.01)
(52) U.S. Cl. ...................................... 439/409
(58) Field of Classification Search .................. 439/409, 439/410, 417
  See application file for complete search history.

(56) References Cited

U.S. PATENT DOCUMENTS

| | | | |
|---|---|---|---|
| 3,380,013 A | 4/1968 | Krone et al. |
| 3,388,370 A | 6/1968 | Elm |
| 3,611,263 A | 10/1971 | Krone et al. |
| 3,808,582 A | 4/1974 | Alridge et al. |
| 3,879,099 A | 4/1975 | Shaffer |
| 3,992,072 A | 11/1976 | Anhalt et al. |
| 4,040,701 A | 8/1977 | Gressitt |
| 4,047,784 A | 9/1977 | Trank |
| 4,127,312 A | 11/1978 | Fleischhacker et al. |
| 4,145,103 A | 3/1979 | Knowles |
| 4,157,208 A | 6/1979 | Roberts et al. |
| 4,159,159 A | 6/1979 | Kaucic et al. |
| 4,171,857 A | 10/1979 | Forberg et al. |
| 4,196,956 A | 4/1980 | Hoffman |
| 4,279,460 A | 7/1981 | Forberg |
| 4,283,103 A | 8/1981 | Forberg et al. |
| 4,306,759 A | 12/1981 | Norden |
| 4,326,767 A | 4/1982 | Silbernagel et al. |
| 4,341,430 A | 7/1982 | Crawford |
| 4,381,132 A | 4/1983 | Tournier |
| 4,444,447 A | 4/1984 | Markwardt |
| 4,484,791 A | 11/1984 | Johnson |
| 4,533,196 A | 8/1985 | Forberg et al. |
| 4,541,679 A | 9/1985 | Fiedler et al. |
| 4,541,682 A | 9/1985 | Gerke et al. |
| 4,547,034 A | 10/1985 | Forberg et al. |
| 4,634,207 A | 1/1987 | Debbaut |
| 4,645,285 A | 2/1987 | Cozzens et al. |

(Continued)

FOREIGN PATENT DOCUMENTS

FR   2622058   10/1987

(Continued)

*Primary Examiner* — Ross N Gushi
(74) *Attorney, Agent, or Firm* — Merchant & Gould P.C.

(57) ABSTRACT

Connector block for electrically connecting a plurality of insulated conductors of a first data cable to corresponding insulated conductors of a second data cable, including first and second opposed rows of insulation displacement contacts (IDCs) extending out of a common side of the connector block for electrical connection with respective ones of the insulated conductors of the first data cable and the second data cable; and a plurality of pairs of levers coupled to the block, wherein relative movement of the levers of each pair of said pairs with respect to corresponding opposed IDCs of the first and second rows of IDCs electrically connects respective ones of the insulated conductors of the first data cable and the second data cable with said opposed IDCs.

22 Claims, 7 Drawing Sheets

U.S. PATENT DOCUMENTS

| | | |
|---|---|---|
| 4,652,070 A | 3/1987 | Suffi |
| 4,652,071 A | 3/1987 | DeBortoli et al. |
| 4,680,233 A | 7/1987 | Camin et al. |
| 4,685,756 A | 8/1987 | Gamarra |
| 4,701,138 A | 10/1987 | Key |
| 4,705,340 A | 11/1987 | Loose |
| 4,714,801 A | 12/1987 | Koblitz et al. |
| 4,729,738 A | 3/1988 | Heng et al. |
| 4,741,780 A | 5/1988 | Atkinson |
| 4,764,125 A | 8/1988 | Debortoli |
| 4,767,354 A | 8/1988 | Saligny |
| 4,773,876 A | 9/1988 | Nakamura et al. |
| 4,822,298 A | 4/1989 | Gerke et al. |
| 4,826,449 A | 5/1989 | Debortoli et al. |
| 4,834,669 A | 5/1989 | Siemon et al. |
| 4,846,721 A | 7/1989 | Debruycker et al. |
| 4,846,735 A | 7/1989 | Teichler et al. |
| 4,864,725 A | 9/1989 | Debbaut |
| 4,871,330 A | 10/1989 | Muller et al. |
| 4,883,431 A | 11/1989 | Uken et al. |
| 4,934,953 A | 6/1990 | Tenham et al. |
| 4,954,098 A | 9/1990 | Hollingsworth et al. |
| 4,993,966 A | 2/1991 | Levy |
| 5,004,869 A | 4/1991 | Koblitz et al. |
| 5,009,612 A | 4/1991 | Rishworth et al. |
| 5,069,637 A | 12/1991 | Baubles |
| 5,090,917 A | 2/1992 | Noorily et al. |
| 5,139,440 A | 8/1992 | Volk et al. |
| 5,140,746 A | 8/1992 | Debbaut |
| 5,149,278 A | 9/1992 | Waas et al. |
| 5,163,855 A | 11/1992 | Gerke et al. |
| 5,195,907 A | 3/1993 | Urban |
| 5,229,058 A | 7/1993 | Uken et al. |
| 5,254,015 A | 10/1993 | Robertson |
| 5,281,163 A | 1/1994 | Knox et al. |
| 5,302,137 A | 4/1994 | Suffi |
| 5,359,654 A | 10/1994 | Jensen et al. |
| 5,423,694 A | 6/1995 | Jensen et al. |
| 5,451,170 A | 9/1995 | Suffi |
| RE35,325 E | 9/1996 | Wass et al. |
| 5,557,250 A | 9/1996 | Debbaut et al. |
| 5,588,869 A | 12/1996 | Jensene et al. |
| 5,597,321 A * | 1/1997 | Jacques .................... 439/417 |
| 5,662,493 A | 9/1997 | Reichle |
| 5,681,182 A | 10/1997 | Reichle |
| 5,779,504 A | 7/1998 | Dominiak et al. |
| 5,785,548 A | 7/1998 | Capper et al. |
| 5,797,759 A | 8/1998 | Mattis et al. |
| 5,863,215 A | 1/1999 | Debbaut et al. |
| 6,025,982 A | 2/2000 | Brower |
| 6,074,239 A | 6/2000 | Camps |
| 6,074,240 A | 6/2000 | Bradshaw et al. |
| 6,113,419 A | 9/2000 | Finley et al. |
| 6,152,760 A | 11/2000 | Reeser |
| 6,162,088 A | 12/2000 | Bonvallat et al. |
| 6,254,420 B1 | 7/2001 | Letailleur et al. |
| 6,254,421 B1 | 7/2001 | Denovich et al. |
| 6,264,495 B1 * | 7/2001 | Robertson et al. .......... 439/409 |
| 6,302,723 B1 | 10/2001 | Baum et al. |
| 6,406,324 B1 | 6/2002 | Duesterhoeft et al. |
| 6,475,029 B2 | 11/2002 | Tucker et al. |
| 6,616,460 B1 | 9/2003 | Shimirak et al. |
| 6,729,900 B2 | 5/2004 | Dooley |
| 6,811,430 B1 | 11/2004 | Carrico et al. |
| 6,893,280 B2 | 5/2005 | Thompson et al. |
| 7,018,230 B2 | 3/2006 | Shimirak |
| 7,056,147 B2 | 6/2006 | Arias et al. |
| 7,110,534 B1 | 9/2006 | Mullaney et al. |
| 7,165,983 B1 | 1/2007 | Fasce et al. |
| 7,303,446 B2 | 12/2007 | Hills et al. |
| 7,335,049 B2 * | 2/2008 | Alarcon et al. ............. 439/409 |
| 7,547,226 B2 * | 6/2009 | Koessler .................... 439/409 |

FOREIGN PATENT DOCUMENTS

| | | |
|---|---|---|
| GB | 2129630 | 5/1984 |
| WO | WO 94/18722 | 8/1994 |
| WO | WO 99/04454 | 1/1999 |
| WO | WO 02/073743 | 9/2002 |
| WO | WO 2004/100317 | 11/2004 |
| WO | WO 2005/048408 | 5/2005 |

* cited by examiner

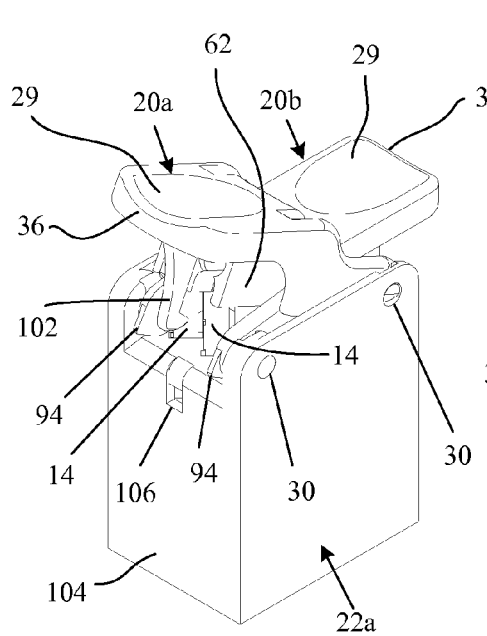
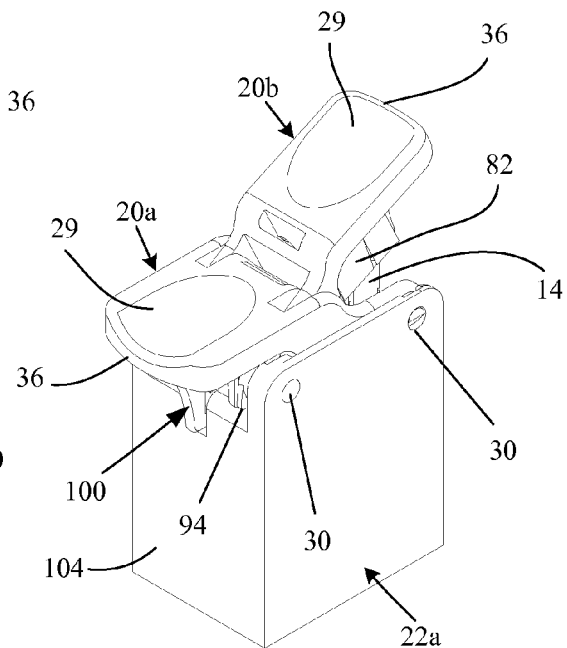
Figure 2d
Figure 2e
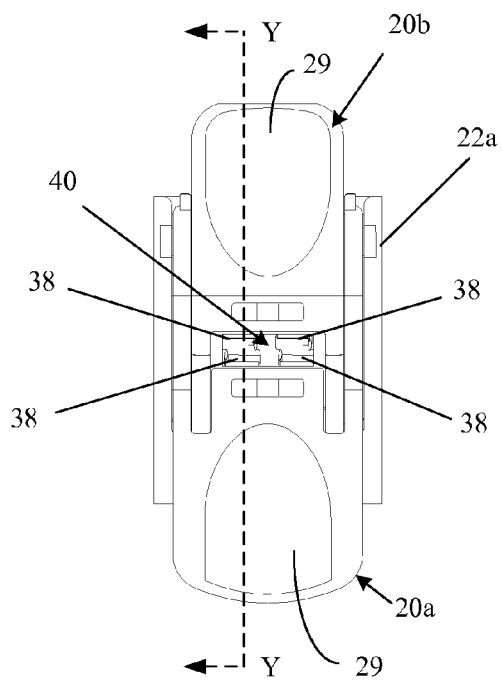
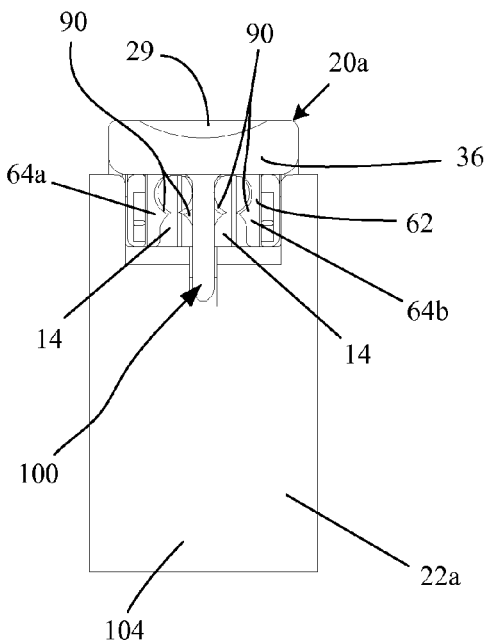
Figure 2f
Figure 2g

CONNECTOR BLOCK

This application is claims benefit of Serial No. 2008904784, filed 15 Sep. 2008 in Australia and which application is incorporated herein by reference. To the extent appropriate, a claim of priority is made to the above disclosed application.

FIELD OF THE INVENTION

The present invention relates to a connector block for electrically connecting a plurality of insulated conductors of a first data cable to corresponding insulated conductors of a second data cable.

BACKGROUND OF THE INVENTION

Electronic data cables are used in modern communication systems to carry voice and data signals between transmitters and receivers. Electronic data cables typically consist of a number of twisted pairs of insulated copper conductors held together in a common insulating jacket. End portions of the insulated conductors of cables are typically terminated in slots of an electrical connector block by insulation displacement contacts (IDCs) seated in the slots. An insulation displacement contact is typically formed from a contact element which is bifurcated so as to define two opposed contact portions separated by a slot into which an insulated conductor may be pressed, or inserted, so that opposing edges of the contact portions engage and displace the insulation and such that the contact portions resiliently engage and make electrical connection with the conductor. The two opposed contact portions of the IDCs are laid open in the slots. As such, an end portion of an insulated conductor can be electrically connected to an IDC by pressing the end portion of the conductor into the slot; this pressing commonly requires the use of a tool specifically designed to mate with the slot and press the conductor into the IDC. It may be inconvenient to locate and operate such a tool whenever conductors are to be terminated. This may be especially the case where the tool is to be operated in a confined space.

International patent application number PCT/US02/05548 describes an insulation displacement connector terminal block with closely-spaced side-by-side pivoting wire stuffer elements. As the stuffer elements are positioned directly side-by-side, the overall dimension of the terminal block may be reduced. International patent application numbers PCT/US04/010553 and PCT/US04/032946 each describe lever-type terminal blocks. Each lever member is configured to receive a pair of telecommunications terminal conductors and connect them to "tip" and "ring" connectors in the body cavity of the block. The terminal blocks described above only serve to terminate wires projecting in one direction from the block.

It is generally desirable to overcome or ameliorate one or more disadvantages or limitations associated with existing connector blocks, or to at least provide a useful alternative.

SUMMARY OF THE INVENTION

In accordance with one aspect of the present invention, there is provided a connector block for electrically connecting a plurality of insulated conductors of a first data cable to corresponding insulated conductors of a second data cable, including:
(a) first and second opposed rows of insulation displacement contacts (IDCs) extending out of a common side of the connector block for electrical connection with respective ones of the insulated conductors of the first data cable and the second data cable; and
(b) a plurality of pairs of levers coupled to the block, wherein relative movement of the levers of each pair of said pairs with respect to corresponding opposed IDCs of the first and second rows of IDCs electrically connects respective ones of the insulated conductors of the first data cable and the second data cable with said opposed IDCs.

Preferably, the IDCs of the first row of said rows of IDCs are electrically couplable to corresponding IDCs of the second row of said rows of IDCs.

Preferably, the levers of each pair of said pairs of levers are hingedly coupled to opposed sides of the block.

Preferably, a first lever of each pair of said levers includes a finger engaging section and two spaced apart arms extending therefrom to respective fulcrums so as to move the finger engaging section between open and closed conditions of use.

Preferably, a second lever of each pair of said levers includes a finger engaging section and two spaced apart arms extending therefrom, inside the spaced apart arms of the first lever, to respective fulcrums so as to move the finger engaging section between open and closed conditions of use.

Preferably, the arms of the first lever and the arms of the second lever of each pair of said pairs of levers cross over one another during movement between open and closed conditions of use.

Preferably, movement of the second lever of each pair of said pairs of levers away from the closed condition of use is limited by the arms of the second lever bearing against the finger engaging section of the corresponding first lever.

Preferably, the relative movement of the levers of each pair of said pairs with respect to corresponding opposed IDCs is effected as the levers move from an open condition of use to a closed condition of use.

Preferably, the fulcrums include lugs extending outwardly away from the arms of the levers into corresponding apertures of the block.

Preferably, the levers of each pair of said pairs of levers include insert guides shaped to at least partially receive end sections of respective ones of the insulated conductors of the first data cable and the second data cable and hold them in fixed positions for insertion into corresponding IDCs during said relative movement.

In accordance with another aspect of the invention, there is provided a method for electrically connecting an insulated conductor of a first data cable to a corresponding insulated conductor of a second data cable using the above-described connector block, including the steps of:
(a) inserting an end of the insulated conductor of the first data cable at least partially into an insert guide of a first lever of a pair of levers of said pairs of levers of the connector block;
(b) moving said first lever from an open condition of use towards a closed condition of use so as to effect said relative movement and electrically terminate the end section of the insulated conductor with a corresponding IDC;
(c) inserting an end of the insulated conductor of the second data cable at least partially into an insert guide of a second lever of said pair of levers of the connector block; and
(d) moving said second lever from an open condition of use towards a closed condition of use so as to effect said relative movement and electrically terminate the end section of the insulated conductor with a corresponding IDC, wherein the IDC electrically coupled to the insulated conductor of the first data cable is electrically coupled to the IDC electrically coupled to the insulated conductor of the second data cable.

BRIEF DESCRIPTION OF THE DRAWINGS

Preferred embodiments of the invention are hereinafter described, by way of non-limiting example only, with reference to the accompanying drawings, which are not to scale, in which:

FIG. 2b is an assembled view of the section connector block shown in FIG. 2a;

FIG. 2d is another view of the section of the connector block shown in FIG. 2b with the levers arranged in another condition of use;

FIG. 2e is another view of the section of the connector block shown in FIG. 2b with the levers arranged in yet another condition of use;

FIG. 2f is a front view of the section of the connector block shown in FIG. 2b;

FIG. 2g is a top view of the section of the connector block shown in FIG. 2b;

FIG. 4b is a back view of the lever shown in FIG. 4a;

FIG. 5b is a back view of the lever shown in FIG. 5a.

DETAILED DESCRIPTION OF PREFERRED EMBODIMENTS OF THE INVENTION

Figure 1:
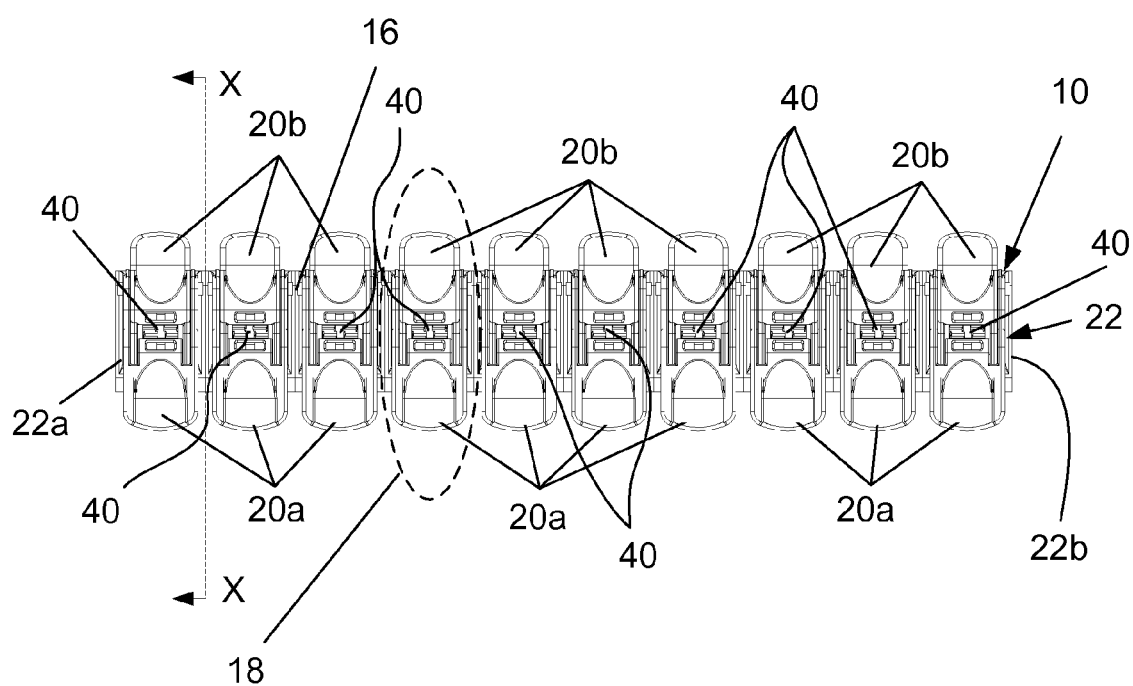
FIG. 1 is a front view of a connector block.

The connector block 10 shown in FIG. 1 is used for electrically connecting a plurality of insulated conductors of a first data cable (not shown) to corresponding insulated conductors of a second data cable (not shown). As particularly show in FIG. 2a, the connector block 10, includes first and second opposed rows 12a, 12b of insulation displacement contacts (IDCs) 14 extending out of a common side 16 of the connector block 10 for electrical connection with respective ones of the insulated conductors of the first data cable and the second data cable. The connector block 10 also includes a plurality of pairs 18 of levers 20a, 20b coupled to the block 10. Relative movement of the levers 20a, 20b of each pair 18 of levers with respect to corresponding opposed IDCs 14 of the first and second opposed rows 12a, 12b of IDCs 14 electrically connects respective ones of the insulated conductors of the first data cable and the second data cable with the opposed IDCs 14. The levers 20a, 20b facilitate quick and easy electrical connection of insulated conductors to the IDCs 14 of the connector block 10 without the need for an additional tool.

The connector block includes a housing 22 formed in front and back parts 22a, 22b. IDCs 14 seated in the back part 22b of the housing 22 extend into the front part 22a of the housing 22 in such a way that ends 24 of the bifurcated contact portions 26 of the IDCs 14 extend through apertures 28 in the common side 16 of the housing 22.

Preferred embodiments of the invention are hereafter described by way of reference to the pair 18 of levers 20a, 20b shown in FIGS. 2a to 3b which form part of the connector block 10. The description of the pairs 18 of levers 20a, 20b is applicable to any other pair 18 of levers 20a, 20b of the connector block 10.

Figure 2A:
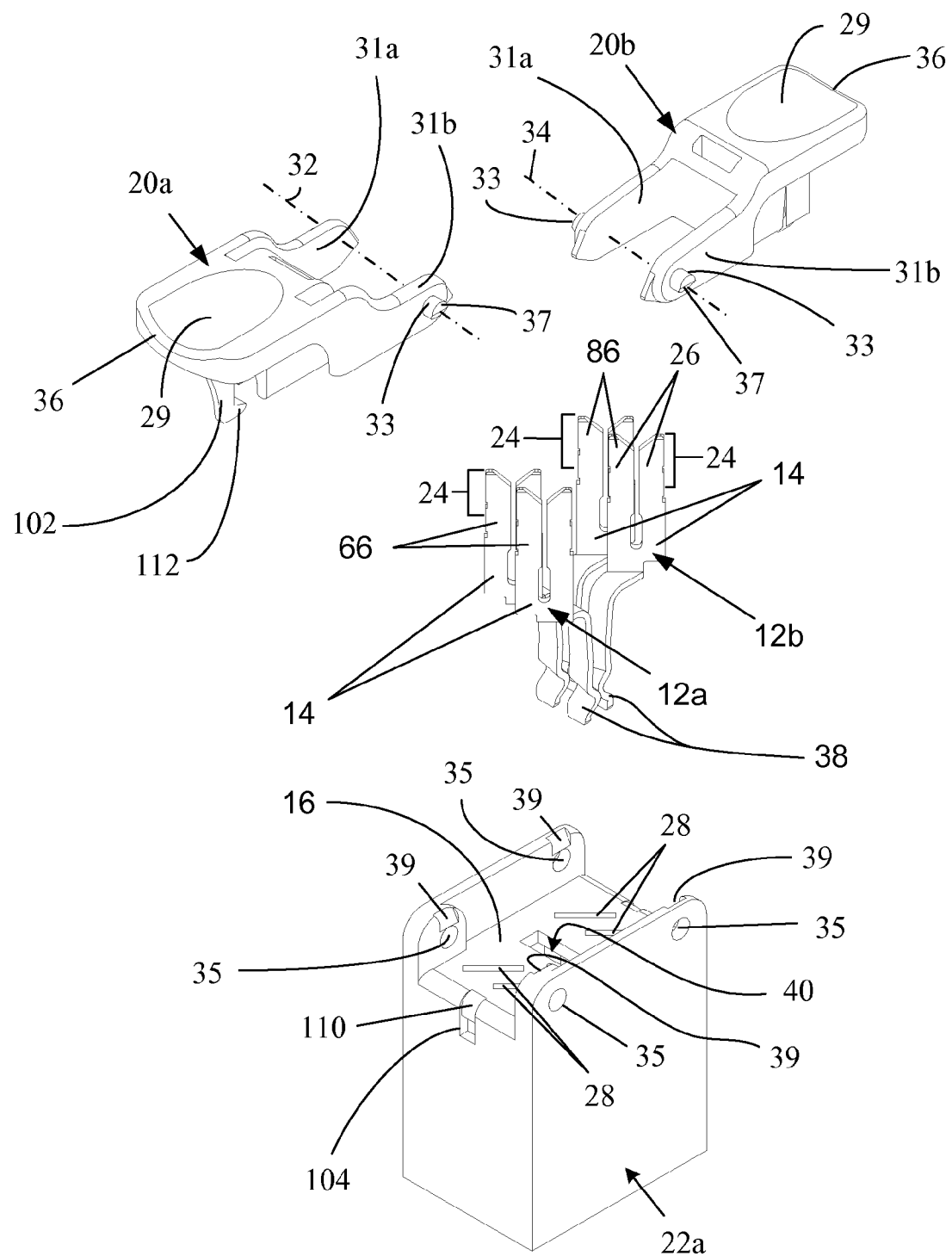
FIG. 2a is an exploded perspective view of a section of the connector block shown in FIG. 1 through the section "X"-"X"
Figure 2B:
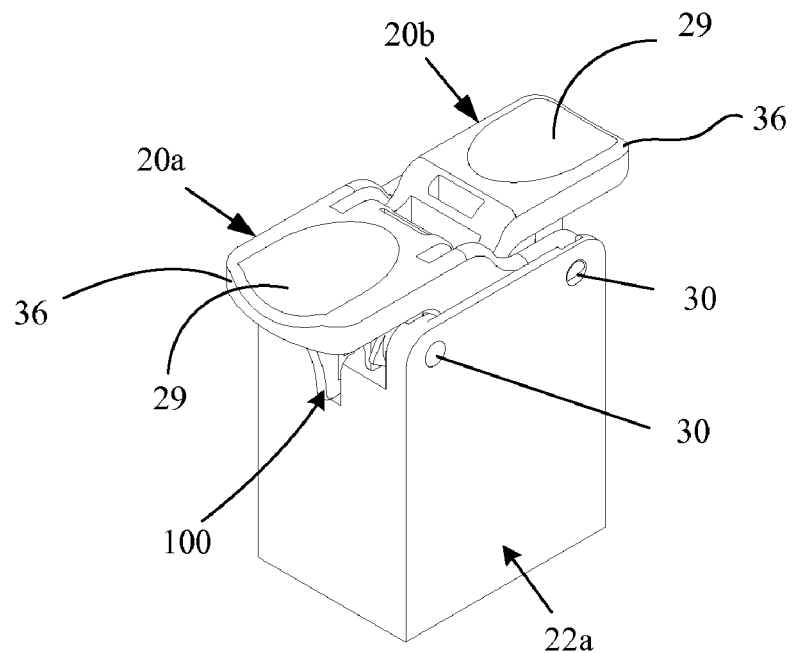

The first lever 20a of the pair 18 of levers includes a finger engaging section 29 and two spaced apart arms 31a, 31b extending therefrom to respective hinges 30 which act to move the lever 20a between the open position shown in FIG. 2d and the closed position shown in FIG. 2b. Similarly, the second lever 20b of each pair 18 of said levers includes a finger engaging section 29 and two spaced apart arms 31a, 31b extending therefrom, inside the spaced apart arms 31a, 31b of the first lever 20a, to respective hinges 30 which act to move the lever 20b between the open position shown in FIG. 2e and closed position shown in FIG. 2b. The arms 31a, 31b of the first lever 20a and the arms 31a, 31b of the second lever 20b cross over one another during movement between open and closed conditions of use. As particularly shown in FIG. 2e, movement of the second lever 20b away from the closed condition of use is limited by the arms 31a, 31b of the second lever 20b bearing against the body of the finger engaging section 29 of the corresponding first lever 20a.

The hinges 30 of each lever 20a, 20b include lugs 33 extending outwardly away from the arms 31a, 31b of the levers 20a, 20b into corresponding apertures 35 of the block 10. The arms 31a, 31b of each lever 20a, 20b are at least partially resiliently compressible with respect to each other so that the lugs 33 can be located in corresponding apertures 35. The levers 20a, 20b can thereby be coupled to, or removed from, the block 10. As particularly shown in FIG. 2a, the lugs 33 include a camming surface 37 for mating with corresponding camming surfaces 39 of the apertures 35. The combined action of the camming surfaces 37, 39 of the lugs 33 and apertures 35 facilitate easy fitting of the levers 20a, 20b to the housing 22.

Figure 2C:
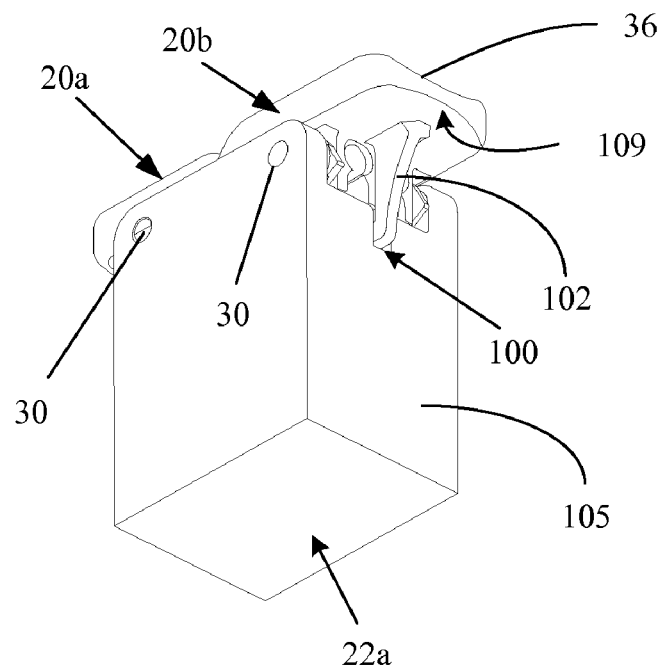
FIG. 2c is another view of the section of the connector block shown in FIG. 2b.

Each lever 20a, 20b rotates about a hinge axis 32, 34 between the closed position, shown in FIGS. 2b and 2c, where a free end 36 of each lever 20a, 20b overlies and abuts IDCs 14 extending through the common side 16 of the housing 22, and the open position, shown in FIGS. 2d and 2e, where each lever 20a, 20b is rotated about its hinge 30 so that it is free end 36 is separated from engagement with its corresponding IDC 14.

As particularly shown in FIG. 2a, spring finger contacts 38 of opposed IDCs 14 in the first and second rows 12a, 12b resiliently bear against each other and hold the opposed IDCs 14 in electrical contact. As particularly shown in FIG. 2f, the front part 22a of the housing 22 includes a testing cavity 40 shaped to receive a testing tool to separate the spring finger contacts 38 of opposed IDCs 14. The testing cavity 40 is accessible when the levers 20a, 20b are in the closed position, as shown in FIG. 2f.

Figure 3A:
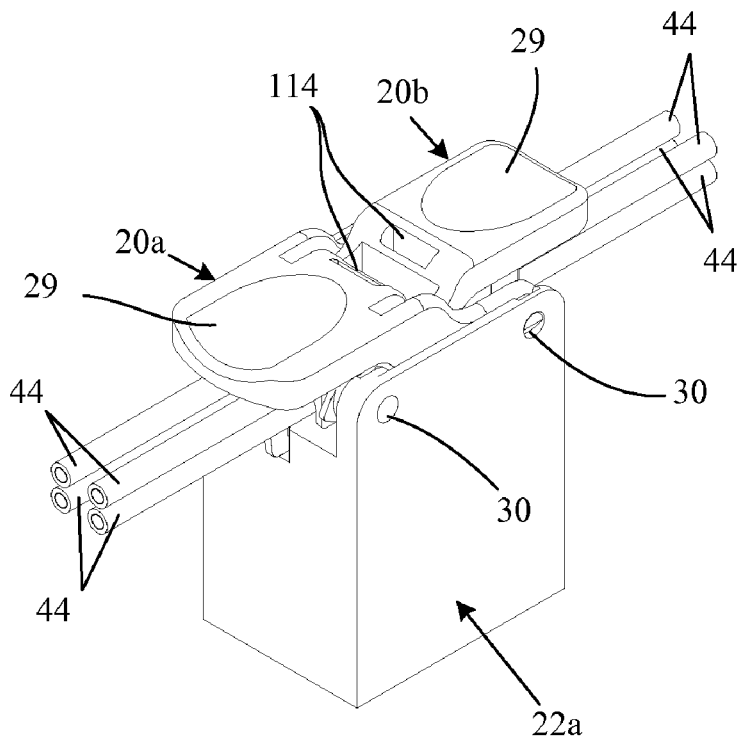
FIG. 3a is another view of the section of the connector block shown in FIG. 2b coupled to insulated conductors.
Figure 3B:
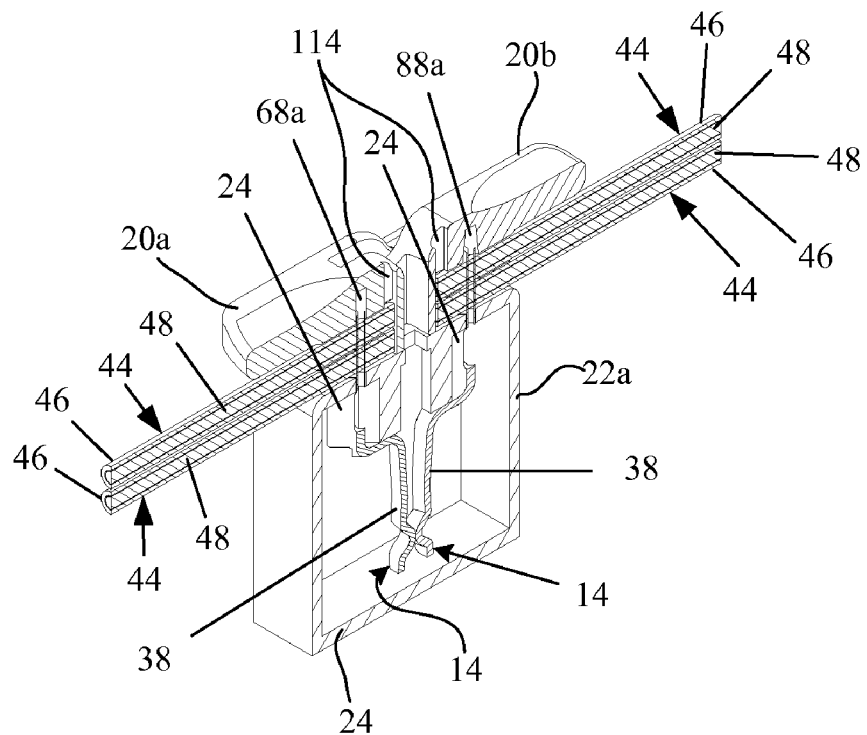
FIG. 3b is a section view of the section of the connector block shown in FIG. 3a through the line "Y"-"Y"

As shown in FIGS. 2a, 3a and 3b, each IDC 14 is formed from a contact element that is bifurcated so as to define two opposed contact portions 26 separated by a slot into which the insulated conductors 44 are pressed so that the edges of the contact portions 26 engage and displace the insulation 46, and resiliently engage, and make electrical connection with, the conductor 48 in the insulated conductor 44. The contact portions 26 project through the slots 28 in the front part 22a of the housing 22 for engagement with the insulated conductors 44.

Figure 4A:
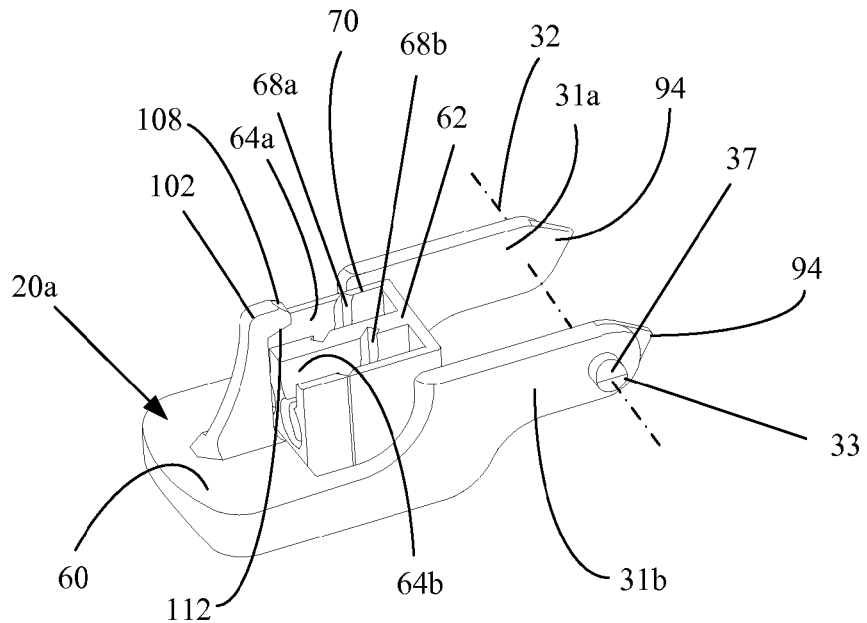
FIG. 4a is a back perspective view of a first lever of a pair of levers of the connector block shown in FIG. 1.
Figure 4B:
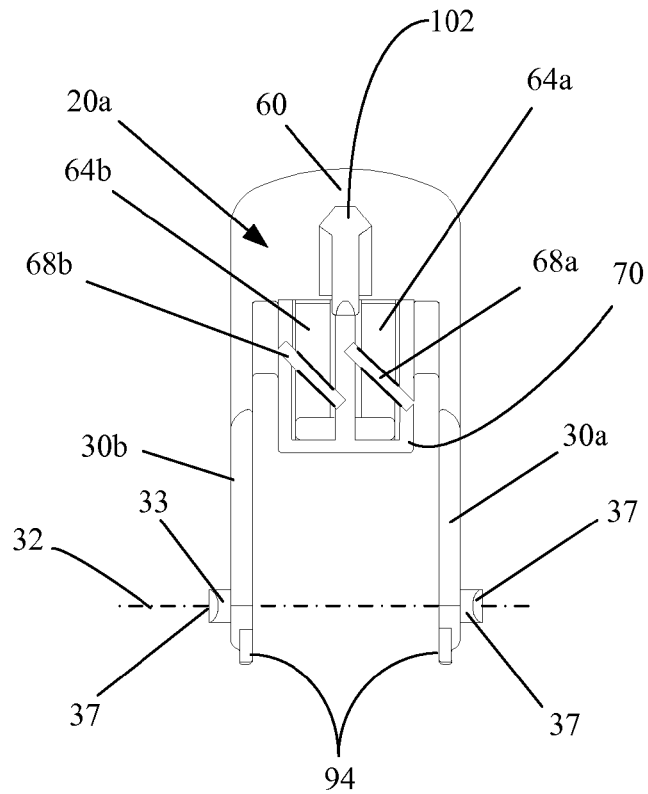

A housing engaging side 60 of the first lever 20a, as shown in FIGS. 4a and 4b, includes an insert guide 62 shaped to at least partially receive end sections of the insulated conductors 44 of the first data cable and hold them in fixed positions for insertion into corresponding IDCs 14 during movement of the lever 20a from the open position towards the closed position. In the embodiment shown, the insert guide 62 includes two adjacent insulated conductor slots 64a, 64b shaped to receive end sections of the insulated conductors 44 of the first data cable when the lever 20a is in the open position. The slots 64a, 64b are generally cylindrical, each having an open end to receive an end of an insulated conductor 44 and a closed end for electrically isolating a terminal end of the insulated conductor 44. The slots 64a, 64b act to hold the insulated conductors 44 in fixed positions for connection to corresponding pairs 66 of IDCs 14 as the lever 20a moves from an opened position towards a closed position. The lever 20a can thereby be used to effect electric connection between the insulated conductors 44 of a twisted pair and a pair 66 of corresponding IDCs 14 by loading end sections of the insulated conductors 44 into respective adjacent slots 64a, 64b of the insert guide 62 and moving the lever 20a from an open position towards a closed position. In doing so, the end sections 24 of the contact portions 26 of the pair 66 of IDCs 14 pass into corresponding IDC slots 68a, 68b of the insert guide 62 that intersect with corresponding insulated conductor slots 64a, 64b of the insert guide 62. The IDC slots 68a, 68b inhibit relative movement of the bifurcated contacts portions 26 of the IDCs 14 as the insulated conductors 44 pass between the contact portions 26.

Figure 5A:
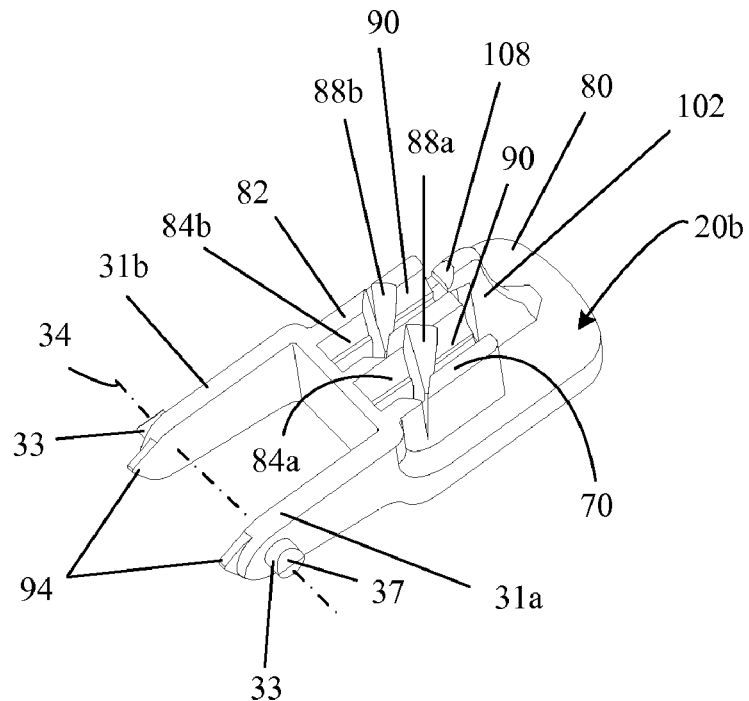
FIG. 5a is a back perspective view of a second lever of a pair of levers of the connector block shown in FIG. 1.
Figure 5B:
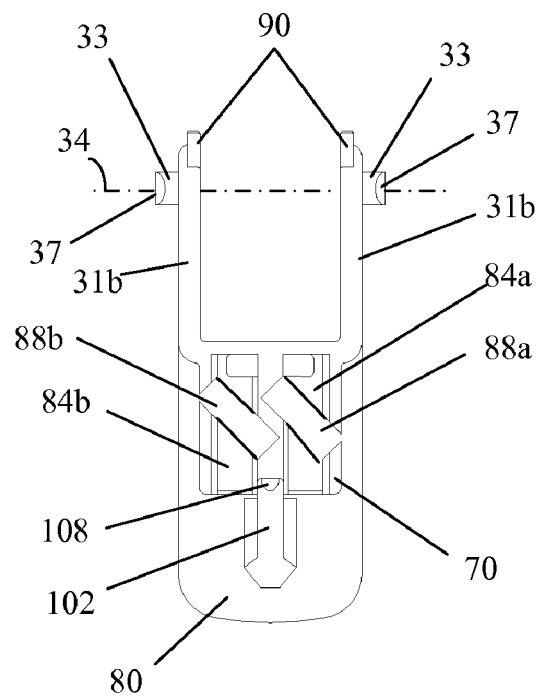

Similarly, the housing engaging side 80 of the second lever 20a, as shown in FIGS. 5a and 5b, includes an insert guide 82 shaped to at least partially receive end sections of the insulated conductors 44 of the second data cable and hold them in fixed positions for insertion into corresponding IDCs 14 during movement of the lever 20b from the open position towards the closed position. In the embodiment shown, the insert guide 82 includes two adjacent insulated conductor slots 84a, 84b shaped to receive end sections of the insulated conductors 44 of the second data cable when the lever 20b is in the open position. The slots 84a, 84b are generally cylindrical, each having an open end to receive an end of an insulated conductor 44 and a closed end for electrically isolating a terminal end of the insulated conductor 44. The slots 84a, 84b act to hold the insulated conductors 44 in fixed positions for connection to corresponding pairs 86 of IDCs 14 as the lever 20b moves from an opened position towards a closed position. The lever 20b can thereby be used to effect electric connection between the insulated conductors 44 of a twisted pair and corresponding pair 86 of IDCs 14 by loading end sections of the insulated conductors 44 into respective adjacent slots 84a, 84b of the insert guide 82 and moving the lever 20b from an open position towards a closed position. In doing so, the end sections 24 of the contact portions 26 of the IDCs 14 pass into corresponding IDC slots 88a, 88b of the insert guide 82 that intersect with corresponding insulated conductor slots 84a, 84b of the insert guide 82. The IDC slots 88a, 88b inhibit relative movement of the bifurcated contacts portions 26 of the IDCs 14 as the insulated conductors 44 pass between the contact portions 26.

Movement of the levers 20a, 20b towards the closed position is limited by stopping surfaces 70 of the insert guides 62, 82 bearing against a body section of the connector block 10.

As particularly shown in FIG. 2g, the slots 64a, 64b of the insert guides 62 each include a partition section 90 that at least partially closes the slot 64a, 64b and permits another insulated conductor 44 to be inserted therein for electrical connection to the same IDC 14 during the above-described relative movement. The slots 84a, 84b include similar partitions 90, as shown in FIG. 5a. The partitions 90 facilitate termination of multiple insulated conductors 44 with each IDC 14.

The levers 20a, 20b allow a user who is inserting the insulated conductors 44 into the connector block 10 to manually and/or digitally actuate the levers 20a, 20b to press the insulated conductors 44 into the respective IDCs 14. Use of the lever 20a, 20b means that there may be no requirement for a separate tool for pressing the conductors 44 into the IDCs 14.

Free ends 36 of the levers 20a, 20b extend past corresponding insert guides 62, 82 away from the hinge axis 34, 34. The free ends 36 may be used to manually and/or digitally actuate the lever 20a, 20b from the closed position towards the open position, thus removing the insulated conductors 44 from their the respective IDCs 14.

Each lever 20a, 20b provides a substantially sealed fit around any exposed conductor 48 of the insulated conductors 44 or the IDC 14. The levers 20a, 20b fit closely over the insulated conductors 44 and the IDCs 14, as shown in FIG. 3b. By at least partially sealing the insulated conductors 44 and the corresponding exposed parts of the IDCs 14 in the described manner, the exposure of these areas to contaminants such as atmospheric air, or moisture, or water can be substantially reduced. Any corrosion of these exposed conductive areas is thereby inhibited. Each lever 20a, 20b, and/or the front part 22a of the housing 22, preferably includes a protective fluid-resistant sealing gel through which an insulated conductor 44 is pressed when inserted into the IDCs 14 and which then sits against and around any exposed conductive area to limit exposure of this area to liquids, air and/or moisture etc. The gel limits corrosion. An example gel is silicone gel.

When arranged in the closed position, insulated conductors 44 electrically connected to IDCs 14 of the first row 12a of IDCs 14 by levers 20a extend in opposite directions to the insulated conductors electrically connected to IDCs 14 of the second opposed row 12b of IDCs 14 by levers 20b. This arrangement gives the connector block 10 a narrow width or pitch (i.e. distance between the free ends 36 of the levers 20a, 20b). Each lever 20a, 20b moves sufficiently away from the front part 22a of the housing 22 into the open position to separate those parts of the lever 20a, 20b that receive the insulated conductors 44 from the IDCs 14. The IDCs 14 would otherwise block or hinder insertion of the insulated conductors 44 into the lever 20a, 20b. The insertion guides 62, 82 of each lever 20a, 20b are at a sufficiently large radius of rotation to allow the generally straight and resilient end sections 24 of the contact portions 26 of the IDCs 14 to slide in and out of the slots 68a, 68b, 88a, 88b with little deformation of the IDC 14 or the levers 20a, 20b. The radius of rotation is provided by having lever arms 31a, 31b of overlapping ranges of motion.

When the insulated conductors 44 are seated correctly in each lever 20a, 20b, the terminal ends of the insulated conductors 44 are visible abutting the end wall of each slot 64a, 64b, 84a, 84b through a window formed by a hole 114 in the respective lever 20a, 20b, as shown in FIGS. 3aA and 3b.

As particularly shown in FIGS. 4a to 5b, each lever 20a, 20b includes a pair of stopping projections 94 extending from respective arms 31a, 31b thereof. The stopping projections 94 limit the extent of rotation of the levers 20a, 20b when they engage the top end of the top part 22a of the housing 22. Each lever 20a, 20b has a range of motion defined by its hinge axis 32, 34 by its length, and by stopping surfaces 94.

The levers 20a, 20b include latches 100 for holding them the closed position. Each latch 100 locks its lever 20a, 20b in the closed position, which then secures the insulated conductors 44 in the IDCs 14 by resisting vertical motion. Each latch 100 includes a projection 102 extending from a free end 36 of the lever extending past a side 104, 105 of the front part 22a of the housing 22; and a cavity 106 formed in the side 104, 105 of the upper part 22a of the housing 22 for receiving the projection 102. Each projection 102 includes an angled camming surface 108, for articulating with a corresponding camming surface 110 of the cavity 106. A further projection 112 on each projection 102 fits into its cavity 106 when the latch 100 is closed.

The projection 102 has sufficient natural resilience to allow the nose 112 to be manually deflected away from the side 104, 105 of the front part 22a of the housing 22 a sufficient distance to fit over the edge of its cavity 106 during insertion. The resilience of the projection 102 allows the nose 112 of the projection 102 to 'snap', or fit, into the cavity 106. The latch 100 preferably makes an audible closing sound when the nose 112 is received into its cavity 106. The audible 'click' allows a user to determine that the lever 20a, 20b is in the closed position, and/or that the insulated conductors 44 in the lever 20a, 20b have been fully, or correctly, inserted into the IDCs 14.

The connector block 10 is operated by performing the following steps:

(i) Opening the levers 20a, 20b by manually and/or digitally rotating and lifting them substantially free of their IDCs 14;

(ii) Inserting the insulated conductors 44 into the corresponding levers 20a, 20b;

(iii) Confirming that the insulated conductors 44 are correctly inserted and seated by viewing the ends of the insulated conductors 44 through the holes 114;

(iv) Closing the levers 20a, 20b by manually (or digitally) pushing them toward the front part 22a of the housing 22, and thereby pressing the seated insulated conductors 44 into the contact portions 26 of the IDCs 14;

(v) Closing the latches 100 by pushing the levers 20a, 20b into the closed position, which first deflects the projections 112 away from the side 104 of the front part 22a of the housing 22, then snaps the projections 112 into the cavities 106 with an audible 'click' for confirming that the levers 20a, 20b are fully closed; and (vi) Testing the electrical connection of opposed IDC pairs 66, 86 by inserting a testing tool into the spring contacts 38 of the front part 22a of the housing 22 via the testing cavity 40.

Many modifications will be apparent to those skilled in the art without departing from the scope of the present invention as hereinbefore described with reference to the accompanying drawings.

PARTS LIST

10 Connector block
12a,
12b Row of IDCs
   Insulation displacement
14 contacts
16 Common side of housing
18 Pair of levers
20a,
20b Lever
22 Housing
22a Front part of housing
22b Back part of housing
   Ends of bifurcated contact
24 portions
26 Contact portions of IDCs
   Finger engaging portion of
29 lever
30 Hinge
31a,
31b Lever arm
32 Axis of rotation
33 Lug
34 Axis of rotation
35 Aperture
36 Free end of lever
37 Camming surface
38 Spring finger contact
39 Camming surface
40 Aperture
44 Insulated conductor
46 Insulation
48 Conductor
   Housing engaging side of
60 lever
62 Insert guide
64a,
64b Insulated conductor slot
66 Pairs of IDCs
68a,
68b IDC slot
70 Stopping surface
   Housing engaging side of
80 lever
82 Insert guide
84a,
84b Insulated conductor slot
86 Pair of IDCs
88a,
88b IDC slot
90 Partition section
94 Stopping projection
100 Latch
102 Projection
104 Side of housing
105 Side of housing
106 Cavity
108 Camming surface
110 Camming surface
112 Projection
114 Viewing hole The claims defining the invention are as follows:

1. A connector block for electrically connecting a plurality of insulated conductors of a first data cable to corresponding insulated conductors of a second data cable, comprising:

(a) first and second opposed rows of insulation displacement contacts (IDCs) extending out of a common side of the connector block for electrical connection with respective ones of the insulated conductors of the first data cable and the second data cable; and (b) a plurality of pairs of levers coupled to the block, the levers of each pair of said pairs of levers being hingedly coupled to opposed sides of the block, wherein a first lever of each pair of said levers includes a finger engaging section and two spaced apart arms extending therefrom to respective fulcrums so as to move the finger engaging section between open and closed conditions of use;

wherein relative movement of the levers of each pair of said pairs with respect to corresponding opposed IDCs of the first and second rows of IDCs electrically connects respective ones of the insulated conductors of the first data cable and the second data cable with said opposed IDCs.

2. The connector block claimed in claim 1, wherein the IDCs of the first row of said rows of IDCs are electrically couplable to corresponding IDCs of the second row of said rows of IDCs.

3. The connector block claimed in claim 2, wherein opposed IDCs are electrically coupled together by electrically conductive spring finger contacts.

4. The connector block clamed in claim 3, including a plurality of apertures arranged along the common side of the block for receiving insulators for electrically isolating the spring finger contacts.

5. The connector block claimed in claim 1, wherein a second lever of each pair of said levers includes a finger engaging section and two spaced apart arms extending therefrom, inside the spaced apart arms of the first lever, to respective fulcrums so as to move the finger engaging section between open and closed conditions of use.

6. The connector block claimed in claim 5, wherein the arms of the first lever and the arms of the second lever of each pair of said pairs of levers cross over one another during movement between open and closed conditions of use.

7. The connector block claimed in claim 6, wherein movement of the second lever of each pair of said pairs of levers away from the closed condition of use is limited by the arms of the second lever bearing against the finger engaging section of the corresponding first lever.

8. The connector block claimed in claim 7, wherein said relative movement of the levers of each pair of said pairs with respect to corresponding opposed IDCs is effected as the levers move from an open condition of use to a closed condition of use.

9. The connector block claimed in claim 1, wherein the fulcrums include lugs extending outwardly away from the arms of the levers into corresponding apertures of the block.

10. The connector block claimed in claim 1, wherein the levers of each pair of said pairs of levers include insert guides shaped to at least partially receive end sections of respective ones of the insulated conductors of the first data cable and the second data cable and hold them in fixed positions for insertion into corresponding IDCs during said relative movement.

11. The connector block claimed in claim 10, wherein the insert guides include insulated conductor slots shaped to receive said end sections of the insulated conductors of the first data cable and the second data cable.

12. The connector block claimed in claim 10, wherein movement of the levers of each pair of said pair of levers is limited by stopping surfaces of the insert guides bearing against a body section of the connector block.

13. The connector block claimed in claim 10, wherein the insert guides include IDC guides shaped to receive bifurcated contact portions of the IDCs during said relative movement.

14. The connector block claimed in claim 13, wherein the IDC guides inhibit relative movement of the bifurcated contacts portions of the IDCs.

15. The connector block claimed in claim 11, wherein the slots of the insert guides are adapted to receive end sections of two insulated conductors for electrical connection to corresponding IDCs during said relative movement.

16. The connector block claimed in claim 10, wherein the end sections of the insulated conductors of the first data cable and the second data cable can be inserted into corresponding insert guides when the levers are arranged in the open condition of use.

17. The connector block claimed in claim 1, wherein the levers include catches for securing the levers in a closed condition of use.

18. The connector block claimed in claim 1, wherein the levers substantially isolate the IDCs from contaminants when arranged in the closed condition of use.

19. The connector block claimed in claim 18, wherein the contaminants include dust.

20. The connector block claimed in claim 18, further comprising a gel for substantially isolating the IDCs from contact with contaminants.

21. The connector block claimed in claim 20, wherein the contaminants include air.

22. The connector block claimed in claim 1, wherein the IDCs of the first and second rows are arranged in opposed pairs and said relative movement of the levers of each pair of said pairs of levers electrically terminates two insulated conductors of the first data cable in corresponding IDCs and two insulated conductors of the second data cable in two IDCs arranged therebetween.

* * * * *